Sept. 10, 1946.   E. W. REMBERT   2,407,514
MANUFACTURE OF FIBRO-CEMENTITIOUS SHEETS
Filed Sept. 11, 1943
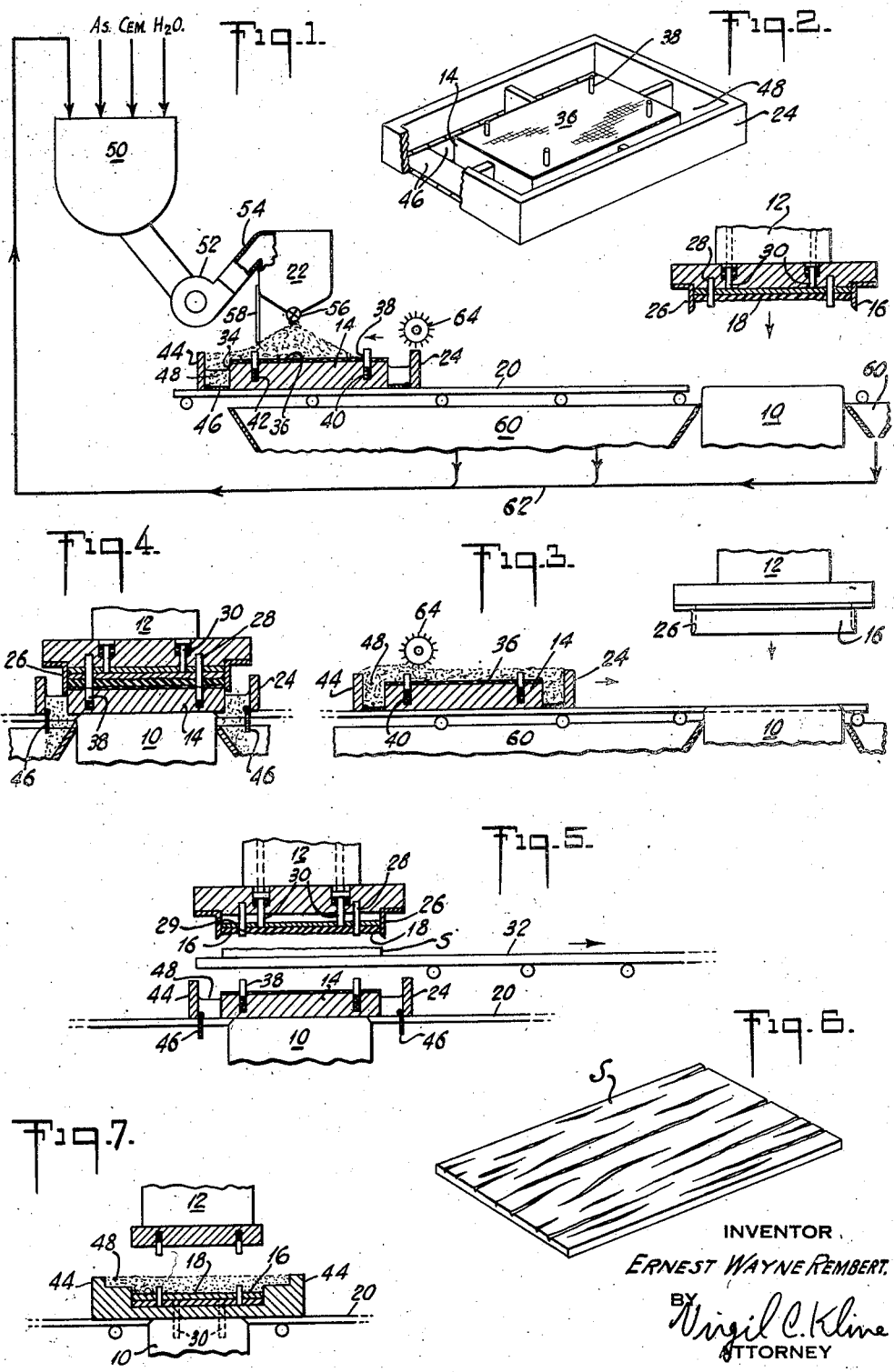
INVENTOR
ERNEST WAYNE REMBERT.
BY
Virgil C. Kline
ATTORNEY

Patented Sept. 10, 1946

2,407,514

UNITED STATES PATENT OFFICE 2,407,514

MANUFACTURE OF FIBROCEMENTITIOUS SHEETS

Ernest Wayne Rembert, Hinsdale, Ill., assignor to Johns-Manville Corporation, New York, N. Y., a corporation of New York Application September 11, 1943, Serial No. 502,047

14 Claims. (Cl. 25—42)

This invention relates to the manufacture of dense and hard fibro-cementitious sheets, and is particularly directed to improved method and apparatus for manufacturing shingles and siding sheets composed largely of asbestos fibers and hydraulic cement.

A conventional method heretofore employed in manufacturing fibro-cementitious sheet materials has utilized a cold press mold comprising a lower cavity and an upper plunger. For manufacturing asbestos-cement sheets in this form of apparatus, the practice has been to fill the mold cavity with a wet, flowable mixture of asbestos and cement, and to subsequently express excess water from the mold charge through a filtering screen incorporated as part of the molding unit. The manufacture of fibro-cementitious sheets by such operation has involved time delays and considerable waste of material.

Another conventional method heretofore employed has involved the steps of feeding a dry mixture of Portland cement and asbestos onto a continuously advancing conveyor, leveling the material to a layer of substantially uniform thickness, moistening the layer of material with sufficient water to hydrate the cement, densifying the layer material by means of compression rolls, cutting the densified material into segmental sheets, piling the segments in stacks between press platens, and highly compressing the sheets, as in a hydraulic press. The sheets thus formed are cured, and are finally trimmed to size and punched to provide nail holes.

A general object of the present invention is to provide a process whereby dense and hard fibro-cementitious sheets, shingles and other shapes may be manufactured more economically than by conventional methods.

A feature of the invention is the provision of a simplified and rapid shingle molding method designed to effect substantial economies over conventional practice in equipment investment, in labor cost, and in largely eliminating the cost of recovering and rehandling scrap.

A more particular object is to provide improvements in process and apparatus whereby dense and hard shingles and other fibro-cementitious shapes may be molded directly to precise dimensions and to high strength specifications while avoiding many of the operating steps including that of trimming to size and shape, and eliminating time delays and material wastes which are involved in operation by conventional methods.

A further object is to provide method and apparatus whereby hard and dense shingles or other shapes may be simultaneously molded and embossed with deep grained and faithful reproductions of cedarwood shingles or the like. Other objects of the invention are to provide improvements in shingle molding process and equipment including the employment of resilient rubber texture plates in the pressure molding and embossing of hard and dense shingles; the rapid loosening and ejection of the cast shingles or other shapes from the mold cavity; the forming of nail holes in the shingles during the molding operation; and the avoidance of difficulties with respect to the complete filling of mold cavity corners and edges, with respect to the dragging and binding of material around the edges of the mold charge, and with respect to economical handling and recycling of excess charge material prior to its developing a hardening set.

With the above and other objects and features in view, the invention consists in the improved method and apparatus for manufacturing fibro-cementitious shingles, siding sheets and the like which are hereinafter described and more particularly defined by the accompanying claims.

In the following description, reference will be made to the attached drawing, in which:

Fig. 1 is a diagrammatic assembly view in vertical elevation, with parts shown in section, showing the parts of the apparatus in the positions which they assume while a mold charge is prepared;

Fig. 2 is a perspective view of the mold plunger platform and mold charging pallet of Fig. 1, with part of one side wall of the pallet broken away to show the excess charge supporting trough surrounding the platform;

Fig. 3 is another diagrammatic view showing parts of the shingle molding apparatus of Fig. 1 at a period in the operating cycle somewhat later than that portrayed in Fig. 1;

Fig. 4 is a diagrammatic view in longitudinal section showing the inverted cavity-platform mold of Fig. 1 in pressure molding position;

Fig. 5 is a diagrammatic view in longitudinal section showing the parts of the mold in the shingle ejecting position at the completion of a molding cycle;

Fig. 6 is a perspective view of an asbestos-cement shingle having a deeply grained wood shingle simulating pattern on one surface thereof, such as may be molded in accordance with the present invention; and Fig. 7 is a diagrammatic sectional view of an upright cavity-plunger mold fitted with a movable, resilient rubber base plate for the cavity and showing excess charge supporting troughs surrounding the cavity.

In the following illustrative description of the invention, the process and apparatus will be particularly described with reference to the manufacture of dense and hard asbestos-cement shingles and siding sheets. It will nevertheless be understood that the invention is broadly applicable to the molding of fibro-cementitious sheets or more intricate shapes embodying reinforcing fibers other than asbestos, and pulverulent bonding agents other than hydraulic cements.

The asbestos fibers and Portland cement may be used in the proportions, and the asbestos fibers may be of the quality and fiber length, that are conventional in the manufacture of asbestos and cement sheets for any given purpose. Thus, in the manufacture of shingles or siding units, there may be used shingle grade chrysotile fibers, as for example Canadian fibers, of which 4–6 ounces are retained on a standard 4 mesh screen, 9 to 11 ounces retained on a 10 mesh screen, and about 1 ounce passes through the 10 mesh screen, when a 16 ounce sample is tested by the standard Quebec wet screen method. The proportions of asbestos and cement may be varied within a considerable range, and in addition to the asbestos and cement, there may be used finely-divided silica and pigments.

Referring to the drawing, 10 and 12 designate respectively the lower and upper platens of a high speed mechanical or hydraulic press. The press should be capable of developing pressures of at least 1000–2000 lbs. per square inch and of operating at a speed of at least 10–20 cycles per minute. Operatively associated with the press is a mold having as its principal elements a plunger 14 and a mold cavity 16. The plunger and mold cavity are relatively movable and proportioned for close telescoping engagement. The base of the mold consists of a texture or embossing plate 18 composed of resilient vulcanized rubber or equivalent rubber substitute. The embossing plate 18 is tightly fitted within the mold cavity so that the walls of the mold cavity restrain the plate against lateral expansion under high molding pressures.

The mold elements may be mounted in conventional relation, with the mold cavity forming the lower charge receiving element of the mold. (Fig. 7.) However, in the preferred apparatus arrangement (Figs. 1–5) the mold cavity is mounted in inverted position as a facing for the upper press platen, and the mold plunger consists of a raised platform 14 which is supported during the press cycle by the lower press platen. It is usually desirable to load the mold from a point at one side of the press. For this purpose, a carriage 20 is provided on which the charge receiving element of the mold may be mounted for reciprocatory movement transversely between the press and a mold charging unit 22. When the charging element of the mold is an upright platform 14, the platform is preferably mounted centrally in a mold charging pallet 24. When the mold cavity is inverted, the cavity side walls are formed by shearing knives 26 having a blade thickness of ¼–½". The forward cutting edges of the shearing knives are preferably tapered as an aid in guiding the mold, and the inner vertical edges of the knife blades are dimensioned to form a tight telescoping fit with the embossing plate base of the mold cavity, and with the side walls of the mold plunger or platform.

In order to eject damp and dense shingles or other shapes from the mold cavity following completion of the high pressure molding operation, it is desirable that the embossing and stripping plate 18 be movably mounted relative to the mold side walls and relative to nail hole punching pins 28 which may be affixed to the frame of the mold cavity. In the drawing, the embossing plate is shown as reciprocably mounted within the mold cavity in tight sliding engagement with the inner sides of the mold side walls and with pins 28. Apertures 29 may be formed in the plate 18 in line with the pins 28 to allow the plate to reciprocate within the mold without interference by the pins. Rods 30 are provided to periodically reciprocate the embossing plate within the mold cavity. In the operation of ejecting a molded shingle from the mold cavity the embossing plate 18 is advanced beyond the forward ends of the vertical sides of the mold cavity to thereby release the formed shingle or other shape from friction engagement by the cavity side walls and by pins 28. When the embossing plate is thus advanced to the position in which it is in Fig. 5, a formed shingle S is ejected from the mold. Just prior to ejection of shingle S from the mold cavity, a receiving table 32 is moved into position within the space between the separated mold sections, to catch the shingle, and the table is thereafter withdrawn from position between the press platens prior to the beginning of another press operating cycle.

The pressure applying surface of the mold plunger 14 has the same edge dimensions and shape as the embossing plate 18. This plunger is designed for close telescopic sliding fit in the mold cavity. The face of plunger 14 may be disposed horizontally, or may be slightly inclined for the purpose of molding a tapered shingle or sheathing board. The platform 14 of the preferred apparatus is provided with vertical side walls 34, and is mounted centrally on charging pallet 24. The platform 14 may be either rigidly affixed to the pallet and to the carriage, or may be movably cradled on the pallet in position to be periodically engaged and elevated away from the pallet by upward movement of the lower press platen 10. The face of the platform 14 is preferably covered by a wire screen 36 having a mesh no coarser than 40x40 to the inch, such screen serving as an air venting non-adherent surface for the mold charge. Nail hole forming pins 38 are reciprocably supported vertically at the face of the platform by means of springs 40 which are in turn retractably mounted in bores 42. The mold charging pallet 24 consists essentially of a frame which is bolted to carriage 20, and which in turn supports a mold charging element, which may be the upright mold cavity of Fig. 7, or the upright mold platform 14 of Figs. 1–5. Each of the pallets is provided with upstanding side walls 44 which are arranged in the form of a rectangle in spaced relation with respect to the vertical side walls of the mold cavity or platform 22. The tops of pallet walls 44 extend upwardly above the top of the charge supporting surface. Hinged charge supporting elements 46 are shown in Figs. 1–5 as pivotally mounted at the bases of side walls 44 in position to form displaceable bottoms for excess charge collecting and charge supporting troughs 48 which entirely surround platform 14. It will be understood that other means than elements 46 may be provided for emptying excess charge material from the pallet 24 for recycling prior to its developing a preliminary set.

In operation, a dry charge mixture containing for example 30–40% by weight of asbestos fibers, 35–45% Portland cement, and 20–30% of finely-divided silica, may be formed by thorough mixing in a rotary paddle type mixer 50. After thoroughly mixing the pulverulent cement and silica with the asbestos fibers in a dry state, water is added in amount approximating 12–20% of the dry weight of the charge, or in amount just sufficient to combine with the hydraulic cement, and the mixture is then agitated to effect uniform moistening of the material. The water is preferably added by means of fine sprays, in amounts which approximate 40% by weight of the hydraulic cement. After a further damp mixing operation, the mixture is subjected to a fluffing operation within a fan 52 to increase its volume and to break down any nodules, and the fluffed mixture is picked up by a carrier air stream for delivery by a pneumatic conveyor 54 to feed hopper 22.

By means of a gate valve 56 at the base of the hopper, a measured charge of the moist, fluffed fiber-cement material may be dropped onto a mold charging pallet 24 and platform 14 whenever such pallet is moved into position beneath the hopper. After a measured charge of material has been dumped on the top surface of mold platform 14 which forms the center of the charging pallet, the carriage 20 continues to move the pallet 24 to the left as viewed in Fig. 1. During this movement the charge material on the platform 14 is leveled in a preliminary way by the action of the bottom edge of a vertically adjustable plate 58. At the end of this charge leveling operation, when the pallet 24 has been moved to the end of its path of travel to the left, the charge material on the platform has been spread out in a layer, and any excess material has been unloaded over the edges of the pallet 24 into a bin 60 from which it is returned by a conveyor 62 to the mixer 50. As carriage 20 moves toward the right as shown in Fig. 3, the layer of charge material on the platform comes in contact with the blades of a rotary picker roll 64 which is mounted to the right of plate 58 in the direction of travel of the platform 14 toward the press. This picker roll is rotated at high speed and is utilized to level off the moist fluffed charge on the mold platform to a layer of predetermined thickness (for example ¾–1") to thereby insure that a charge of uniform volume enters the mold for each molding operation.

At the beginning of a molding cycle, the inside edges of shearing knives 26 advance into close sliding engagement with the vertical edges of platform 14. During this operation the layer of charge material which is supported by the platform face and by plates 46 is cleanly cut through, and the retained charge layer is highly compressed between the platform and the embossing plate 18 at the base of the mold cavity. After the charge is trapped within the mold cavity, plates 46 may swing downwardly at this period of the cycle. Thus excess charge material is emptied from the troughs of the mold charge pallet into bins 60 located at the sides of the lower press platen, during that portion of the press operating cycle in which the charge material on the mold platform is being highly compressed within the mold cavity. The excess charge material thus emptied into bins 60 is recycled by screw conveyors or equivalent mechanism to the charge mixing chamber 50 before it has had time to develop any hardening preliminary set. At the end of this brief molding cycle, the press platens are separated, and the molded shingle is ejected from the mold cavity in the manner previously described.

A final operation in the manufacture of asbestos cement shingles or siding sheets involves a cure of the compressed sheet to develop a final set. To develop maximum strength it is desirable to keep the shape in a moist condition until after the initial set. For shingle mixtures incorporating finely-divided silica, maximum strengths are developed by steam curing the shingles or sheets in an autoclave filled with steam under approximately 100 lbs. pressure, over a period of about 24 hours after the initial set has occurred. Shapes thus produced develop a dry density of 110–120 lbs. per cubic ft. and a modulus of rupture of at least approximately 4000 lbs. per square inch. When using a high speed heavy duty press of the type now available, it is possible to mold hard and dense shingles or siding sheets of say 600 sq. inches and ¼–⅜ butt thickness, tapering to say $\frac{1}{16}$–⅓ inch, at the rate of 12–20 units per minute, allowing 3–5 seconds for each press cycle.

Other hydraulic cements, as for example, calcium aluminate cement, or a mixture of lime and comminuted diatomaceous earth, may be substituted for the Portland cement. When calcium aluminate cement is used, curing is best effected without steaming, and without the addition of silica. Mixtures comprising asbestos and Portland cement without finely-divided silica are best cured without steaming. A suitable mixture of this type may consist of about 25–35 parts asbestos fibers of the shingle grade of fineness, about 50–65 parts Portland cement, and 15–20 parts water. The proportion of asbestos and cement may be varied within a suitable range, say 50–100% of asbestos on the weight of the Portland cement. In addition to the asbestos and cement, there may be used pigments as desired, and various conventional fillers. Cements which do not incorporate free silica may be cured by standing for about a day at normal room temperature, during which time the cement takes its initial set. The final set is then developed by long standing at atmospheric or moderately elevated temperature.

The inverted cavity-upright platform telescopic mold has substantial advantages for molding non-free-flowing, moist and fluffed mixtures of asbestos and Portland cement. Molds of the conventional upper plunger-lower cavity type are not as practicable for molding asbestos-fiber-cement shingles because of the difficulties encountered in filling the mold corners and edges, in avoiding the dragging and binding of charge material around the mold edges, in effecting rapid ejection of the pressed shingle from the mold, and in forming nail holes in the shingle during the molding operation.

Since dry or moist materials containing asbestos fibers do not flow freely even under high pressure, it is very necessary to develop uniform distribution of the material throughout the mold before pressing and densifying the material to final shape. The process includes the step of supporting a layer of the charge material on the mold charging element against lateral displacement up to the time that it enters the mold cavity, by surrounding the mold charge with excess charge material which is carried in a shallow trough supported by the charging pallet. The operation of fluffing the charge material eliminates the presence of lumps which would otherwise be formed by the primary mixing of water with the cement, and also insures accurate measurement of a mold charge and a uniform density throughout the formed sheet. A fluffed mixture is also much easier to cut transversely along the edges of the platform by the shearing knives, because of the absence of any appreciable number of moistened cement lumps. Experience has shown that sheets or shingles produced from a charge mixture which has been previously fluffed have 5-10% higher strength or modulus of rupture, as compared to sheets produced from an unfluffed mixture.

Vulcanized rubber which is resilient and not too hard, affords an exceptionally suitable material for use as an embossing or texture plate, because it can be molded to conform closely to the surface irregularities of a surface such as deeply grained wood which is to be reproduced. However, rubber cannot ordinarily be used in conventional methods and equipment for producing hard and dense asbestos-cement shingles because it deforms too easily under the high pressures which are employed. According to the present invention, a texture sheet of rubber or equivalent resilient rubber substitute material is used as the base of the mold cavity. Suitable results have been obtained with rubber texture sheets ranging from 60-80% of the hardness of hard vulcanized rubber. Use of such rubber texture sheets is permitted by the fact that the walls of the mold cavity closely confine the rubber sheets against lateral expansion under the heavy molding pressure. The pattern surfaces of such rubber texture sheets include elastic protuberances which are spread or deformed by expanding laterally to some degree under pressure, and which then contract upon release of pressure. This contraction loosens any bond between the embossing surface and the moist compressed asbestos-cement shingles, which adhere to most other types of texture plates. Another advantage of employing a texture plate of resilient rubber lies in the possibility of applying a finely grained and suitably colored veneer to the surface of the shingle simultaneously with the shingle molding and embossing operation. This can be done by simply spray coating the rubber texture plate with the veneer between each molding cycle.

By providing the upright platform element of the inverted mold with a facing of fine wire mesh screen, difficulties are avoided with respect to sticking of the formed shingle to the platform as the platform and cavity elements of the mold are separated at the end of the molding operation. Such screen has the additional function of bleeding off any air which is squeezed out of the charge mixture during the press molding cycle, while at the same time being of sufficiently fine mesh to prevent escape of charge solids through, or sticking within, the screen pores.

While the higher strength shingles incorporate silica and require steam curing to develop their full strength, shingles of ample strength can be produced without silica and by following normal curing methods. Even prior to the curing cycle, and because of the high pressures employed in the molding operation, the shingles have developed sufficient wet strength to withstand normal handling without breakage or distortion.

The process is economical because of the small number of operations required, and because of the high output capacity of the press and the elimination of material waste. Because of the extreme simplicity of the apparatus requirements, almost complete automatic control is feasible, with consequent reduction of labor costs to a minimum.

Since many variations may be made from the illustrative details given, without departing from the scope of the invention, it is intended that the invention should be limited only by the terms of the claims interpreted as broadly as consistent with novelty over the prior art.

What I claim is:

1. In molding hard and dense fibro-cementitious sheets, the steps comprising, depositing a non-free-flowing moist, fluffed asbestos fiber-cement mixture on a substantially horizontal mold charging surface, leveling the mixture material in a layer of predetermined thickness over said surface, supporting the layer of material against lateral displacement while cutting out a mold charge by a transverse shearing operation, and after said shearing operation compressing the charge into a mold cavity under a pressure of at least 1500-2000 lbs. per square inch.

2. The method of molding hard and dense fibro-cementitious sheets to precise dimensions in a molding cycle of not to exceed five seconds duration which comprises, distributing a loose mixture of shingle grade asbestos fibers, pulverulent hydraulic cement and only sufficient water to hydrate the cement in a substantially horizontal layer of predetermined area and thickness, supporting the layer of material against lateral displacement while cutting out a mold charge from the central portion of said layer by a transverse shearing stroke, and as a continuation of said shearing stroke strongly compressing the charge into a mold cavity and against a resilient embossing surface under a pressure of at least 1500-2000 lbs. per square inch, and thereafter releasing the pressure and ejecting the sheet from the mold cavity.

3. In manufacturing hard and dense fibro-cementitious sheets, the steps comprising, distributing a mixture of shingle grade asbestos fibers, pulverulent hydraulic cement and only sufficient water to hydrate the cement in a layer of predetermined area and thickness, supporting the layer of charge material against lateral displacement by maintaining excess charge material surrounding said layer, transversely shearing said layer to the peripheral dimensions of a mold cavity, and in a continuation of said shearing stroke strongly compressing the retained layer material into the mold cavity and into pressure contact with a resilient rubber embossing plate, thereby embossing a pattern on a surface of the sheet.

4. In manufacturing a hard and dense fibro-cementitious shape, the steps comprising, mixing asbestos fibers and pulverulent hydraulic cement in a dry state, moistening the mixture with water in amount only sufficient to hydrate the cement, opening and fluffing the mixture, distributing the moist mixture in a layer of predetermined area and thickness, restraining said layer of material against lateral displacement while transversely shearing it to the peripheral dimensions of a mold cavity and strongly compressing the resulting mold charge into the mold and into contact with a resilient rubber embossing plate, thereby embossing a pattern on the surface of the compressed shape, loosening the shape from the plate by release of pressure, and curing the shape to effect hydration and setting of the cement.

5. A method of molding a moist and fluffed fiber-cement mixture which comprises, depositing and leveling a measured volume of said mixture in a layer on a raised platform surface, laterally supporting said layer of material on said platform by means of excess material surrounding said layer, transversely shearing said layer to the peripheral dimensions of said platform, and strongly compressing the retained layer between the platform and an inverted mold cavity under a pressure in excess of 1000 lbs. per square inch.

6. A method of molding a non-free-flowing moist mixture of asbestos fibers and pulverulent cement to precise dimensions in a molding cycle of not to exceed five seconds duration which comprises, depositing and leveling a measured volume of said mixture in a layer of predetermined thickness on a raised platform surface, laterally supporting said layer and platform of material on said platform by means of excess material surrounding said layer, transversely shearing said layer to the peripheral dimensions of said platform, and restraining the retained layer of material against lateral displacement while strongly compressing it between the platform and a resilient embossing sheet.

7. In apparatus for molding dense and hard fiber-cement sheets, telescopically fitting relatively movable mold cavity and mold plunger elements, a resilient rubber texture plate reciprocably mounted within the mold cavity and forming the base of the mold cavity, means for restraining said plate against movement within the mold cavity while the mold elements are advancing into telescopic relation in molding a charge, a press having relatively movable platens operatively connected respectively with said mold cavity and plunger elements, said plate being movable independently of movement of the platens, and means for depositing and leveling a non-free-flowing charge of fiber-cement mixture in a layer of predetermined area and thickness over a face of one of said mold elements.

8. Apparatus for molding fiber-cement sheets as defined in claim 7, including a mold charging pallet on which the charge receiving surface of said mold is centrally mounted, said pallet including a trough entirely surrounding the mold charge receiving surface and adapted to laterally support a layer of charge material on such surface by means of excess charge material in said trough.

9. In apparatus for molding dense and hard asbestos-cement sheets, a mold having telescopically fitting inverted mold cavity and raised platform elements, a press having upper and lower relatively movable platens operatively connected respectively with said mold cavity and platform elements, and means for depositing and leveling a non-free-flowing charge of fiber-cement mixture in a layer of predetermined thickness over said platform surface.

10. Apparatus for molding asbestos-cement sheets as defined in claim 9 including a resilient rubber texture plate forming the base of the mold cavity, and shearing knives forming the walls of the mold cavity and closely confining the texture plate against lateral expansion under pressure, said texture plate and shearing knives being relatively movable independently of movement of the mold elements whereby to eject a molded sheet from the cavity.

11. Apparatus for molding asbestos-cement sheets as defined in claim 9 including a mold charging pallet in which said mold platform is centrally mounted, said pallet including a trough entirely surrounding the mold platform whereby to laterally support a layer of charge material on the platform by means of excess charge material in said trough.

12. In apparatus for molding dense and hard fiber-cement sheets, telescopically fitting relatively movable inverted mold cavity and upright mold plunger elements, a resilient embossing plate forming the base of the mold cavity, a press having relatively movable platens operatively connected respectively with said mold cavity and plunger elements, a carriage mounting the mold plunger for actuation between molding cycles as a charge receiving and transporting unit, and means for depositing and leveling a non-free-flowing charge of fiber-cement mixture in a layer of predetermined area and thickness over the face of said mold plunger.

13. In apparatus for molding dense and hard fiber-cement shapes, telescopically fitting relatively movable mold cavity and mold plunger elements, a resilient rubber texture sheet forming the base of the mold cavity, a press having relatively movable platens operatively connected respectively with said mold cavity and plunger elements, a carriage mounted for reciprocatory movement transversely of said press platens, said carriage mounting one of said mold elements for actuation between molding cycles as a charge receiving and transporting unit, and means for depositing and levelling a non-free-flowing charge of fiber-cement mixture in a layer of predetermined area and thickness over a face of one of said mold elements.

14. In apparatus for molding dense and hard fiber-cement shapes, telescopically fitting relatively movable mold cavity and mold plunger elements, a resilient rubber texture sheet forming the base of the mold cavity, means for periodically effecting relative movement of the texture sheet and cavity side walls whereby to eject a molded shape from the mold, a press having relatively movable platens operatively connected respectively with said mold cavity and plunger elements, a carriage mounting one of said mold elements for actuation between molding cycles as a charge receiving and transporting unit, and means for depositing and levelling the charge in a layer of predetermined area and thickness over a face of one of said mold elements.

ERNEST WAYNE REMBERT.